US008320934B2

(12) United States Patent
Sheynblat (10) Patent No.: US 8,320,934 B2
(45) Date of Patent: *Nov. 27, 2012

(54) DYNAMIC LOCATION ALMANAC FOR WIRELESS BASE STATIONS

(75) Inventor: Leonid Sheynblat, Hillsborough, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/833,813

(22) Filed: Aug. 3, 2007

(65) Prior Publication Data
US 2007/0270168 A1 Nov. 22, 2007

Related U.S. Application Data

(63) Continuation of application No. 11/211,230, filed on Aug. 24, 2005, now Pat. No. 7,257,413.

(51) Int. Cl.
*H04W 24/00* (2009.01)
(52) U.S. Cl. ........ 455/456.1; 455/424; 455/411; 455/404.2; 455/423; 455/449; 455/425; 455/447; 455/448; 342/125; 342/126
(58) Field of Classification Search ........ 455/456.1, 455/411, 404, 423–425, 447–449; 342/126
See application file for complete search history.

(56) References Cited

U.S. PATENT DOCUMENTS

| | | | |
|---|---|---|---|
| 5,276,905 A | 1/1994 | Hurst et al. | |
| 5,276,906 A | 1/1994 | Felix | |
| 5,327,144 A | 7/1994 | Stilp et al. | |
| 5,512,908 A | 4/1996 | Herrick | |
| 5,708,975 A * | 1/1998 | Heiskari et al. | 455/63.1 |
| 5,717,406 A * | 2/1998 | Sanderford et al. | 342/457 |
| 5,812,087 A | 9/1998 | Krasner | |
| 5,841,396 A | 11/1998 | Krasner | |
| 5,874,914 A | 2/1999 | Krasner | |
| 5,945,944 A | 8/1999 | Krasner | |
| 5,999,124 A | 12/1999 | Sheynblat | |
| 6,055,434 A | 4/2000 | Seraj | |
| 6,061,018 A | 5/2000 | Sheynblat | |

(Continued)

FOREIGN PATENT DOCUMENTS

CA 2296812 A1 8/2000
(Continued)

OTHER PUBLICATIONS

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1).

(Continued)

*Primary Examiner* — Nimesh Patel
(74) *Attorney, Agent, or Firm* — Linda G. Gunderson (57) ABSTRACT

A system and method of dynamically updating an almanac of base stations with wireless phones that are controlled by end users. First, second, and third location information are received respectfully from a first, second, and third wireless phones. A position of each wireless device is known. The distance between each wireless device an uncooperative base station is determined while accounting for an uncertainty factor. A location of the uncooperative base station is calculated using the first, second, and third location information and the distances. The almanac is updated with the location.

45 Claims, 7 Drawing Sheets

U.S. PATENT DOCUMENTS

| | | | |
|---|---|---|---|
| 6,108,558 | A | 8/2000 | Vanderspool, II |
| 6,111,538 | A * | 8/2000 | Schuchman et al. ...... 342/357.12 |
| 6,128,492 | A | 10/2000 | Chung |
| 6,147,644 | A | 11/2000 | Castles et al. |
| 6,185,427 | B1 | 2/2001 | Krasner et al. |
| 6,208,290 | B1 | 3/2001 | Krasner |
| 6,215,442 | B1 | 4/2001 | Sheynblat et al. |
| 6,236,365 | B1 | 5/2001 | LeBlanc et al. |
| 6,236,635 | B1 | 5/2001 | Miyamoto et al. |
| 6,249,252 | B1 | 6/2001 | Dupray |
| 6,271,788 | B1 | 8/2001 | Longaker et al. |
| 6,275,707 | B1 | 8/2001 | Reed et al. |
| 6,389,291 | B1 | 5/2002 | Pande et al. |
| 6,414,635 | B1 | 7/2002 | Stewart et al. |
| 6,430,415 | B1 | 8/2002 | Agashe et al. |
| 6,445,927 | B1 | 9/2002 | King et al. |
| 6,466,938 | B1 | 10/2002 | Goldberg |
| 6,593,863 | B2 | 7/2003 | Pitio |
| 6,650,288 | B1 | 11/2003 | Pitt et al. |
| 6,677,894 | B2 | 1/2004 | Sheynblat et al. |
| 6,677,895 | B1 * | 1/2004 | Holt ........................... 342/357.1 |
| 6,704,574 | B2 | 3/2004 | Lin |
| 6,754,488 | B1 | 6/2004 | Won et al. |
| 6,757,545 | B2 | 6/2004 | Nowak et al. |
| 6,799,047 | B1 | 9/2004 | Bahl et al. |
| 6,801,778 | B2 | 10/2004 | Koorapaty et al. |
| 6,865,395 | B2 | 3/2005 | Riley |
| 6,888,811 | B2 | 5/2005 | Eaton et al. |
| 6,937,867 | B2 | 8/2005 | Oda et al. |
| 6,941,145 | B2 | 9/2005 | Ogino et al. |
| 6,956,527 | B2 | 10/2005 | Rogers et al. |
| 7,006,838 | B2 | 2/2006 | Diener et al. |
| 7,039,418 | B2 | 5/2006 | Amerga et al. |
| 7,047,022 | B2 | 5/2006 | Aoyama |
| 7,054,627 | B1 | 5/2006 | Hillman |
| 7,057,557 | B2 | 6/2006 | Lee |
| 7,069,024 | B2 | 6/2006 | Sharony |
| 7,082,311 | B2 | 7/2006 | Hefner et al. |
| 7,127,257 | B2 | 10/2006 | Riley et al. |
| 7,139,580 | B2 | 11/2006 | Stein et al. |
| 7,142,848 | B2 | 11/2006 | Owen et al. |
| 7,149,531 | B2 | 12/2006 | Misikangas |
| 7,158,798 | B2 | 1/2007 | Lee et al. |
| 7,203,503 | B2 | 4/2007 | Cedervall et al. |
| 7,206,585 | B2 | 4/2007 | Gilham et al. |
| 7,215,281 | B2 | 5/2007 | Tekinay et al. |
| 7,224,982 | B2 | 5/2007 | Ormson |
| 7,224,983 | B2 | 5/2007 | Budka et al. |
| 7,248,858 | B2 | 7/2007 | Barber et al. |
| 7,251,493 | B2 | 7/2007 | Camp, Jr. et al. |
| 7,257,411 | B2 | 8/2007 | Gwon et al. |
| 7,257,413 | B2 | 8/2007 | Sheynblat |
| 7,280,505 | B2 | 10/2007 | Chaskar et al. |
| 7,295,808 | B2 | 11/2007 | Soliman |
| 7,319,878 | B2 | 1/2008 | Sheynblat et al. |
| 7,369,859 | B2 | 5/2008 | Gallagher |
| 7,706,813 | B2 | 4/2010 | Shim |
| 7,873,375 | B2 | 1/2011 | Annunziato et al. |
| 2002/0080759 | A1 | 6/2002 | Harrington et al. |
| 2002/0137526 | A1 | 9/2002 | Shinohara |
| 2002/0199196 | A1 | 12/2002 | Rabinowitz et al. |
| 2003/0006931 | A1 | 1/2003 | Mages |
| 2003/0008663 | A1 | 1/2003 | Stein et al. |
| 2003/0008664 | A1 | 1/2003 | Stein et al. |
| 2003/0022675 | A1 | 1/2003 | Mergler |
| 2003/0026225 | A1 | 2/2003 | Ogino et al. |
| 2003/0096622 | A1 | 5/2003 | Moilanen |
| 2003/0144006 | A1 | 7/2003 | Johansson et al. |
| 2003/0157943 | A1 | 8/2003 | Sabat, Jr. |
| 2003/0203738 | A1 * | 10/2003 | Brown et al. ............... 455/456.1 |
| 2003/0210656 | A1 | 11/2003 | Biacs et al. |
| 2003/0220105 | A1 | 11/2003 | Daigremont et al. |
| 2003/0235172 | A1 | 12/2003 | Wood |
| 2004/0023640 | A1 * | 2/2004 | Ballai ........................... 455/411 |
| 2004/0043765 | A1 | 3/2004 | Tolhurst |
| 2004/0127229 | A1 | 7/2004 | Ishii |
| 2004/0162090 | A1 | 8/2004 | Suryanarayana et al. |
| 2004/0203567 | A1 | 10/2004 | Berger |
| 2004/0203926 | A1 | 10/2004 | Ruutu et al. |
| 2004/0258012 | A1 | 12/2004 | Ishii |
| 2004/0259546 | A1 | 12/2004 | Balachandran et al. |
| 2005/0004527 | A1 | 1/2005 | Prescott |
| 2005/0020309 | A1 | 1/2005 | Moeglein et al. |
| 2005/0037775 | A1 * | 2/2005 | Moeglein et al. .......... 455/456.1 |
| 2005/0043038 | A1 | 2/2005 | Maanoja et al. |
| 2005/0064877 | A1 | 3/2005 | Gum et al. |
| 2005/0090266 | A1 | 4/2005 | Sheynblat |
| 2005/0124355 | A1 | 6/2005 | Cromer et al. |
| 2005/0125493 | A1 | 6/2005 | Chaskar et al. |
| 2005/0153687 | A1 | 7/2005 | Niemenmaa et al. |
| 2005/0197137 | A1 | 9/2005 | Radic et al. |
| 2005/0227689 | A1 | 10/2005 | Jewett |
| 2005/0227705 | A1 | 10/2005 | Rousu et al. |
| 2005/0227707 | A1 | 10/2005 | Law et al. |
| 2005/0232189 | A1 | 10/2005 | Loushine |
| 2005/0246334 | A1 | 11/2005 | Tao et al. |
| 2005/0250516 | A1 | 11/2005 | Shim |
| 2006/0245406 | A1 | 11/2006 | Shim |
| 2007/0001867 | A1 | 1/2007 | Rowe et al. |
| 2007/0002813 | A1 | 1/2007 | Tenny et al. |
| 2007/0121560 | A1 | 5/2007 | Edge |
| 2007/0140163 | A1 | 6/2007 | Meier et al. |
| 2008/0123608 | A1 | 5/2008 | Edge et al. |
| 2009/0104904 | A1 | 4/2009 | Shim |
| 2010/0062752 | A1 | 3/2010 | Shim |

FOREIGN PATENT DOCUMENTS

| | | |
|---|---|---|
| CN | 1413058 | 4/2003 |
| DE | 10142954 | 4/2003 |
| EP | 0933961 | 8/1999 |
| EP | 1215928 | 6/2002 |
| EP | 1289320 | 3/2003 |
| JP | 10213644 | 8/1998 |
| JP | 2000156881 | 6/2000 |
| JP | 2001500256 | 1/2001 |
| JP | 2001305210 | 10/2001 |
| JP | 2001333184 | 11/2001 |
| JP | 2002077965 | 3/2002 |
| JP | 2002510893 | 4/2002 |
| JP | 2003047045 | 2/2003 |
| JP | 2003152633 | 5/2003 |
| JP | 2003319443 | 11/2003 |
| JP | 2004040775 | 2/2004 |
| JP | 2004129026 A | 4/2004 |
| JP | 2005195429 | 7/2005 |
| JP | 2005525016 | 8/2005 |
| JP | 2005536944 A | 12/2005 |
| JP | 2007525093 | 8/2007 |
| JP | 2007525094 T | 8/2007 |
| KR | 19980702271 | 7/1998 |
| KR | 19990047966 | 7/1999 |
| KR | 20000022270 A | 4/2000 |
| KR | 20010071208 | 7/2001 |
| KR | 20010087969 A | 9/2001 |
| KR | 20020073167 | 9/2002 |
| KR | 20030011866 | 2/2003 |
| KR | 20030052838 A | 6/2003 |
| KR | 20030079972 | 10/2003 |
| KR | 20050098901 | 10/2005 |
| RU | 2001531 C1 | 10/1993 |
| RU | 2163053 C2 | 2/2001 |
| WO | WO9307684 A1 | 4/1993 |
| WO | WO9810306 A1 | 3/1998 |
| WO | WO9957576 | 11/1999 |
| WO | WO0027143 A1 | 5/2000 |
| WO | WO0221873 A1 | 3/2002 |
| WO | WO02079797 A1 | 10/2002 |
| WO | 03010552 | 2/2003 |
| WO | 03058986 | 7/2003 |
| WO | WO03058985 | 7/2003 |
| WO | WO03094285 A2 | 11/2003 |
| WO | WO2004017092 A1 | 2/2004 |
| WO | WO2004019559 | 3/2004 |
| WO | 04032561 | 4/2004 |
| WO | WO2004045110 | 5/2004 |
| WO | WO2004106964 | 12/2004 |
| WO | 05004528 | 1/2005 |

| WO | 2005004527 | 1/2005 |
| WO | WO2005027393 | 3/2005 |
| WO | WO2005029120 | 3/2005 |
| WO | WO2005089384 | 9/2005 |
| WO | 06029277 | 3/2006 |

OTHER PUBLICATIONS

International Search Report—PCT/US06/033268, International Search Authority—European Patent Office, Feb. 13, 2007.

3GPP TS 25.305 V7.3.0, (Jun. 2006), 3rd Generation Partnership Project; Technical Specification Group Radio Access Network, "Stage 2 functional specification of User Equipment (UE) positioning-in UTRAN (Release 7)," pp. 1-79.

3rd Generation Partnership Project 2 "3GPP2", Internet Article, Version 1.0 (Online), Oct. 2005, Section 4 (6 pages).

3rd Generation Partnership Project 2 "3GPP2": "cdma2000 Packet Data Services; Wireless Local Area Network (WLAN) Inter-working," 3GPP2 X.S0028-000-0, Version 1.0, pp. 1-119 (Jul. 2006).

3rd Generation Partnership Project 2 "3GPP2": "TIA/EIA-41-D Location Services Enhancements," 3GPP2 X.S0002, Version 1.0.0, pp. 1-234 (Mar. 2004).

3rd Generation Partnership Project; Technical Specificatiln Group GSM/EDGE Radio Access Network, "Generic access to A/Gb interface; Stage 2 (Release 6)," 3GPP TS 0 43.318 V6.8.0, pp. 1-71 (Nov. 2006).

3rd Generation Partnership Project; Technical Specification Group GSM/EDGE Radio Access Network, "Functional stage 2 description of Location Services (LCS) in GERAN (Release 4)," 3GPP TS 43.059 V4.7.0, pp. 1-50 (Apr. 2006).

3rd Generation Partnership Project; Technical Specification Group Services and Systems Aspects, "3GPP system to Wireless Local Area Network (WLAN) interworking; System description (Release 6)," 3GPP TS 23.234 V6.10.0, pp. 1-75 (Sep. 2006).

3rd Generation Partnership Project; Technical Specification Group Services and System Aspects, "Functional stage 2 description of Location Services (LCS)(Release 7)," 3GPP TS 23.271 V7.6.0, pp. 1-141 (Sep. 2006).

Anonymous: "Position Determination Service for cdma2000(R) Spread Spectrum Systems;(Revision of TIA/EIA/IS-801); TIA-801-A" 19000101, Apr. 2004, XP017004816 p. 2.5-p. 2.6.

Joint Standard, "Enhanced Wireless 9-1-1 Phase II (Erratum)," J-STD-036-B, pp. 1-344 (Jun. 2006).

Open Mobile Alliance, "Secure User Plane Location Architecture," Candidate Version 1.0, pp. 1-80 (Sep. 2006).

Universal Mobile Telecommunications System (UMTS); Radio Resource Control (RRC); Protocol specification (3GPP TS 25.331 version 5.18.0 Release 5) ETSI TS 125 331 V5.18.0, pp. 1-1047 (Sep. 2006).

International Preliminary Report on Patentability, PCT/US06/033268, IB/Geneva Switzerland Feb. 26, 2008.

Written Opinion PCT/US06/033268 International Search Authority European Patent Office Feb. 28, 2008.

Translation of Office Action in Korean application 10-2005-7024968 corresponding to U.S. Appl. No. 10/877,205, citing US6236365 and KR20010071208 dated Jan. 17, 2011.

Translation of Office Action in Korean application 2010-7013139 corresponding to U.S. Appl. No. 11/557,451, citing KR20050098901 and US20050153687 dated Feb. 24, 2011.

Orville, "Development of the National Lightning Detection Network," BAMS, Feb. 2008, 11 pages.

* cited by examiner

DYNAMIC LOCATION ALMANAC FOR WIRELESS BASE STATIONS

CROSS-REFERENCED RELATED APPLICATION

This application is a continuation of U.S. application Ser. No. 11/211,230 filed on Aug. 24, 2005, now U.S. Pat. No. 7,257,413 which is hereby incorporated by reference in its entirety.

REFERENCES TO RELATED APPLICATIONS

This application is related to copending U.S. patent application Ser. No. 10/936,130, filed Sep. 7, 2004, U.S. patent application Ser. No. 10/971,591, filed Oct. 21, 2004, and copending U.S. patent application Ser. No. 10/877,205, filed Jun. 25, 2004, which is a nonprovisional of U.S. patent application Ser. No. 60/483,094, filed Jun. 27, 2003.

BACKGROUND

This disclosure relates in general to location systems and, more specifically, but not by way of limitation, to updating a location almanac.

There is an ever growing desire to know geographic position of various mobile devices. For example, cellular phone operators are trying to comply with requirements to locate handsets for emergency purposes. Once position is known, emergency personnel can be dispatched to aid in resolving the emergency. Knowing geographic location serves many other purposes, such as geographic-tied advertising, child supervision, automated parolee supervision, reverse 911, fleet vehicle tracking, or the like.

Almanacs are often available for a group of cellular base stations for a particular cellular phone provider. The almanac indicates where the cellular base stations are located for the particular cellular phone provider. With this information, ranging to these cellular base stations allows determining a position of the mobile device. Unfortunately, the almanacs can be poorly maintained and even contain inaccurate locations for the cellular base stations. Inaccurate almanacs can result in inaccuracies in determining the geographic position of the mobile phone.

SUMMARY

A method and system are disclosed that allow for dynamically updating an almanac of base stations with wireless phones controlled by end users. As the wireless phones travel, they gather location information on various base stations. By knowing a location of a wireless phone and determining a distance to a base station in at least three instances, the position of the base station can be trilaterated. The almanac stores the various locations and distances used to determine the position. With every new measurement to a base station, the position may be further refined. Some embodiments weight the measurements by an uncertainty factor related to the accuracy of the mobile device and base station used to make a distance measurement.

The disclosure includes different ways to determine the position of the base station. Some wireless phones are capable of determining their location, while others rely upon the larger system to determine location. In any event, location is determined somewhere. When coupled with a distance measurement between the location and the base station, this information can be coupled with other data points in a determination of the position of the base station.

The disclosure also includes ways to weight the location information gathered by various wireless phones. Newer readings are weighted to have priority over older readings under the presumption that any movement of the base station would make the older readings less accurate. Also, the accuracy of the measurement is used in weighting the various readings. Spurious readings are filtered out of the process so that the almanac is not affected by a spurious or erroneous reading. Where a spurious reading indicates a base station has moved, old measurements are purged and do not affect future location calculations.

BRIEF DESCRIPTION OF THE DRAWINGS

Like reference numerals may be used to denote like or similar parts or features. Further, various components of the same type may be distinguished by following the reference number by a dash and a second number that distinguishes among the similar components. If only the first reference number is used in the specification, the description is applicable to any one of the similar components having the same first reference number irrespective of the second reference number.

DETAILED DESCRIPTION

Figure 1A:
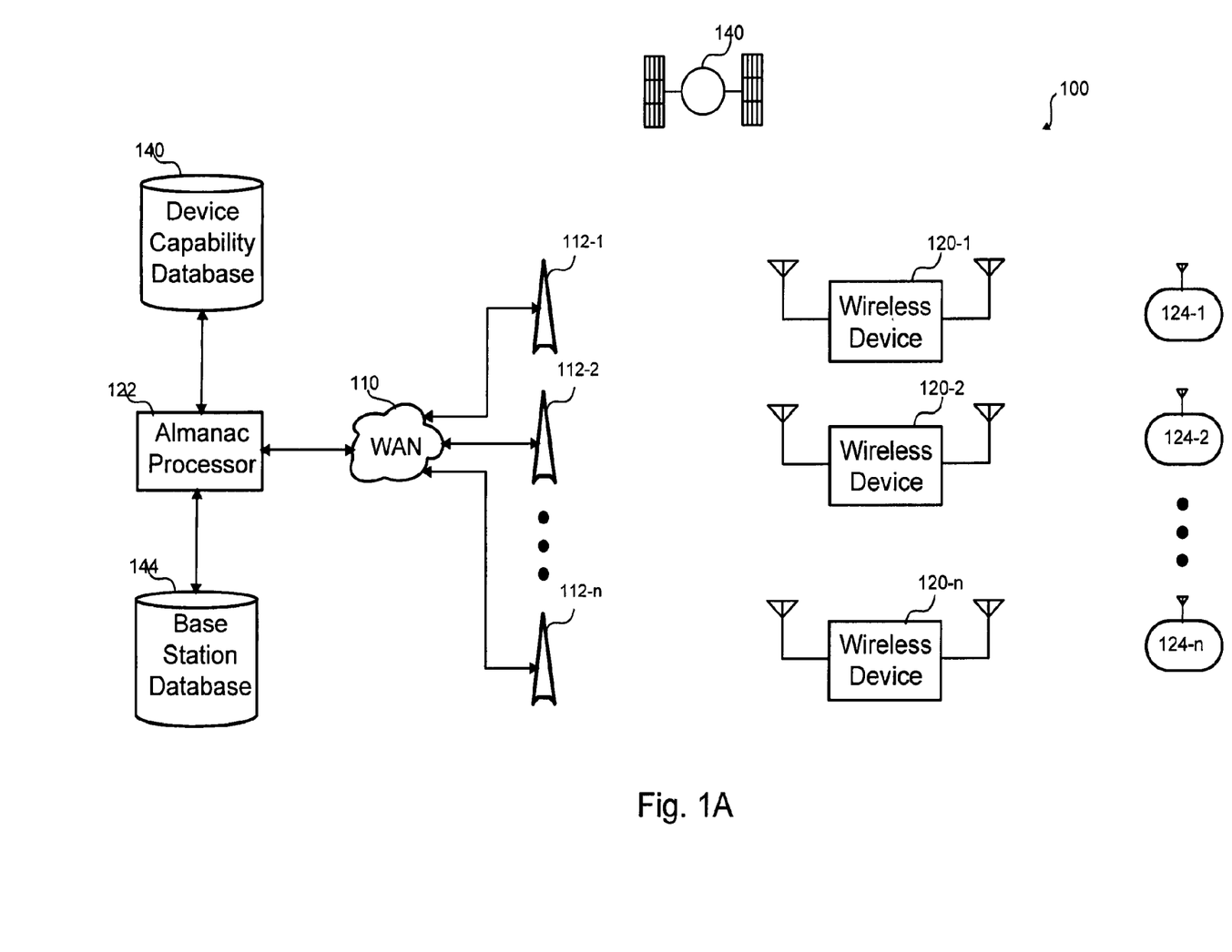
FIGS. 1A and 1B are block diagrams of embodiments of a dynamic almanac system.

Referring first to FIG. 1A, a block diagram of an embodiment of a dynamic almanac system 100 is shown. The dynamic almanac system 100 allows wireless devices 120 to find their geographic location by using satellites 140 (e.g., GLONASS, GPS, Galileo) and/or base stations 112, 124 (e.g., cellular phone base station, a wireless local area network, a wireless wide area network, satellite phone, satellite Internet, or any other wireless phone that can be recognized by the wireless device 120). Once the location of the wireless device 120 is known, the wireless device 120 can gather location information on the base stations 112, 124 and forward that location information to cooperative base stations 112. Cooperative base stations 112 are coupled to an almanac processor 112 by way of a wide area network (WAN) 110. The almanac processor 112 accesses a device capability database 140 before analyzing the location information. Once analyzed, a base station database or almanac 144 is updated according to the estimated location of the base station 112, 124.

The wireless device 120 can communicate with any number of base stations 112,124 to provide location information. In this embodiment, the wireless device 120 is a cellular phone that may have any number of communication modes (e.g., GSM, CDMA, digital AM or FM radio, digital TV, TDMA, WCDMA, OFDM, GPRS, EV-DO, WiFi, Bluetooth, WiMAX, UWB, satellite phone or data, etc.) to transfer voice and/or data with cellular, satellite and/or mesh networks by way of their base stations 112, 124. The wireless device 120 in other embodiments could be a tracking device, a child or parolee monitor, navigational device, wireless pager, wireless computer, etc. The supported communication modes for each wireless device are stored in the device capability database 140 that includes information to help in determining an uncertainty factor for each location or distance measurement made by a particular wireless device 120.

This embodiment shows cooperative base stations 112, uncooperative base stations 124 and a satellite location beacon 140 that could each have different communication modes. For example, a cellular base station 112, 124 might support TDMA and GSM, a satellite base station might support only CDMA, or another satellite base station might support only GSM. Typically, a wireless device 120 would support a subset of the various communication modes.

Base stations 112, 124 are defined herein to allow some sort of data or voice transport. Base stations 112, 124 are often affiliated with some entity such that only subscribers or subscribers to another system with a roaming agreement can communicate with the base station 112, 124 to pass data and/or voice traffic. A cooperative base station 112 is one that allows data and/or voice with the wireless device 120. Uncooperative base stations 124 may not allow data and/or voice traffic, but do provide information useful in determining their location. Uncooperative base stations 124 provide some type of identifier and can often be used for ranging, which is a process where the distance between the base station 124 and the wireless device 120. The identifier in the case of a WiFi base station 124, for example, includes a station identifier and MAC address. Uncooperative base stations 124 are any wireless device that is typically stationary, provides information to uniquely identify the base station, and can be used to determine some measure of distance to a wireless device 120.

The almanac processor determines the locations of the base stations 112, 124 in this embodiment. The device capability database 140 is to interpret the data provided by wireless devices 120 and the results and raw data are stored in the base station database 144. With less than three measurements by wireless devices 120, the accuracy of the base station position is limited. With the first measurement, the accuracy can be limited to the communication range of such a base station 112, 124 using a particular communication mode. With the second measurement, the accuracy can be further limited. Three measurements allow a trilateration of the location to whatever accuracy the wireless devices can provide. Over three measurements allow further improving the location estimation.

In some cases, uncooperative base stations 124 move too frequently to be useful. For example, some trains are equipped with WiFi access points and mobile phones can have Bluetooth access. Some embodiments will not add certain models of uncooperative base stations to the almanac that are believed too portable. Likelihood of mobility can be stored as a factor in the device capability database 140. Those models more likely to move are less likely to be used in the base station database. Other embodiments only add some or all models if it were found that they were not moving. Before allowing a particular uncooperative base station to be added to any almanac, the almanac processor 122 could wait until a number of measurements were taken that indicated the same location.

The base station database 144 stores the identifier information that can be used to uniquely identify each base station in that class of base stations. For example, each WiFi base station could include a MAC address as identifier information. Characteristics of the base station 112, 124 could be used in uniquely identifying the base station 112, 124. For example, if two base stations had the same station identifier, but only one supported a particular communication standard, the two could be uniquely identified. Also stored in stored in the base station database 144 is location information that is determined for each base station 112, 124 by performing surveys of the area with the wireless devices. This location information could include a position formulated from data gathered on three or more occasions or could include the data itself for use in refining or recalculating the position.

In one embodiment, wireless devices 120 can be used to determine the location of each base station 112, 124, thereafter the location is reported back to the almanac processor 112. The location information from various wireless devices 120 for each base station 112, 124 is aggregated by the almanac processor 112 to update the base station database 144 in a dynamic manner. As more location data points are gathered for a particular base station 112, 124, they are weighted according to the accuracy of the wireless device 120 and used to resolve the location of that particular base station 112, 124 with ever increasing accuracy. The accuracy of each wireless device 120 is stored in the device capability database 140, which could have different accuracies for the various ways that a wireless device 120 could gather the information. Any uncertainty that the wireless device 120 could have in knowing its location could also be reflected in the accuracy weighting for the location information in the base station database 144.

Various types of location beacons could be used by the wireless device 120 to aid in the location determination. This embodiment uses a satellite location beacon 140, but terrestrial ones could be used (e.g., LORAN). The more location references, generally, the better the location of the wireless device can be determined.

The accuracies of the location of the wireless device 120 and the ranging measurement is stored in the base station database 144 such that these uncertainty factors can be used in the base station location determination to estimate an accuracy. In one embodiment, it is presumed that older measurements to a base station 112, 124 are less accurate than newer measurements. This presumption arises because some base stations 112, 124 are easily moved. The uncertainty factor for a given reading is increased over time to deemphasize older readings in favor of newer readings.

In some embodiments, spurious location readings for a base station 112, 124 may be ignored or cause older readings to be reconsidered in various situations. Where a base station appears to have traveled an unusual distance since the last reading, the almanac processor 122 may either take the position that the reading is erroneous or that the base station 112, 124 has moved. In one example, a fresh reading of a particular base station indicates that it is located more than 5 miles from its previous location. Since the maximum range of this particular base station is 1 mile, it is presumed that the base station has moved and the old readings are purged. When a reading is within the maximum range, but far different from the other readings, the almanac processor may wait for confirmation by another wireless device 120 before purging old location readings.

This embodiment shows the almanac processor 122 separate from the cooperative base stations 112, but each cooperative base station 112 could have an almanac processor 112 in other embodiments. The almanac processor 122 could be implemented with a computer or network of computers either in a single location or distributed across a number of locations. The base station database 144 could be centrally located, but other embodiments could distribute this database 144 regionally or in portions relevant to each cooperative base station 112. For example, a first base station 112-1, may store a portion of the base station database 114 for its footprint and all adjacent base station footprints.

Figure 1B:
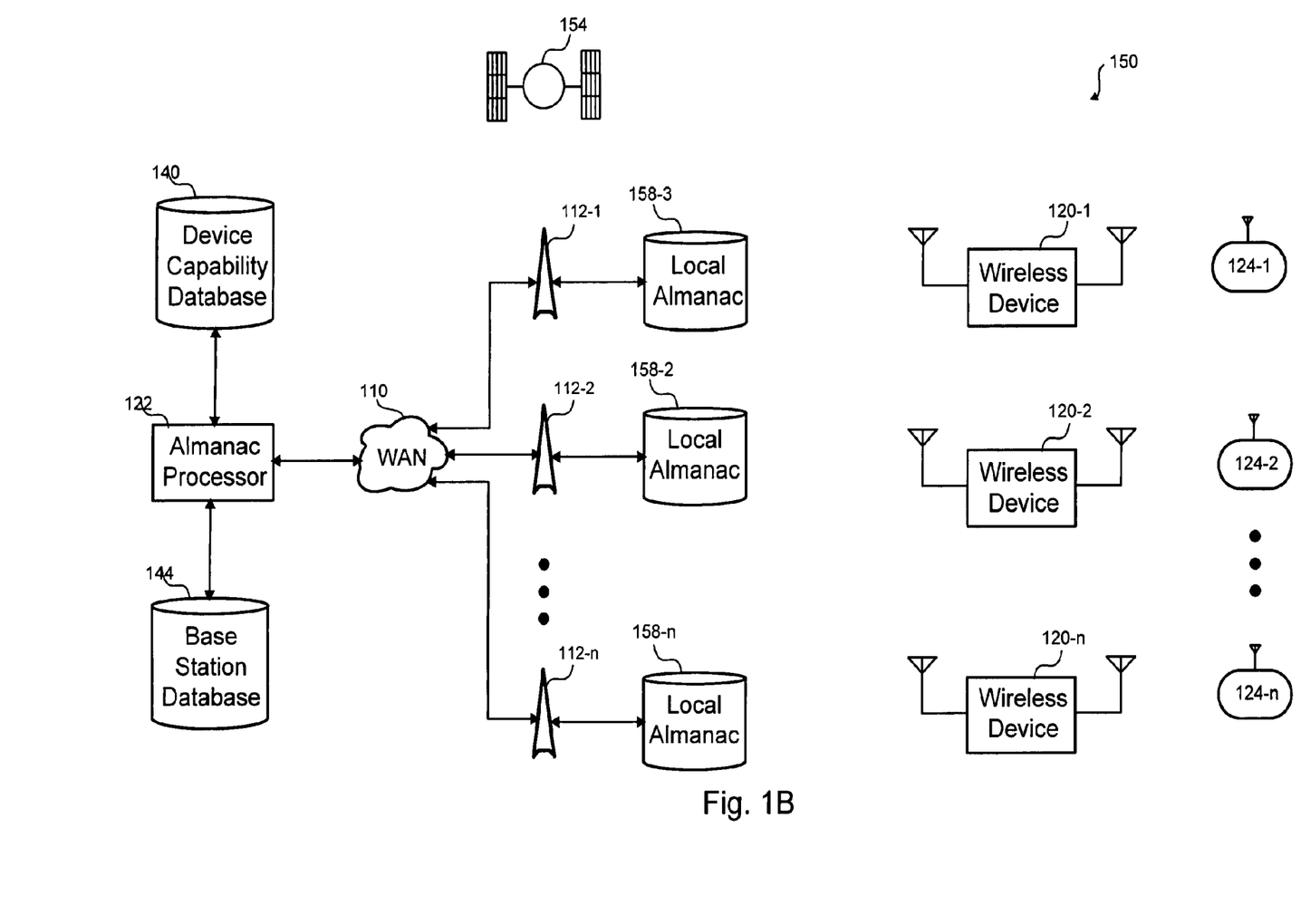

Referring to FIG. 1B, another embodiment of the dynamic almanac system 150 is shown. In some embodiments, the base station database 144 is centrally located, but the base station database 144 is distributed regionally or in portions relevant to each cooperative base station 112 as a local almanac 158 in the embodiment. For example, a first base station 112-1, may store a portion of the base station database 114 for its footprint and all adjacent base station footprints in a first local almanac 158-1. As the various local almanacs 158 are updated, those changes are propagated to the centrally-located base station database 144.

This embodiment does not use a location beacon 140, but has one or more communication satellites base stations 154 for use in voice and/or data communication. This embodiment of the communication satellite base station 154 could, but does not, have a local almanac 158. The communication satellite base station 154 relies upon the almanac processor 122 to produce tailored almanacs.

Figure 2:
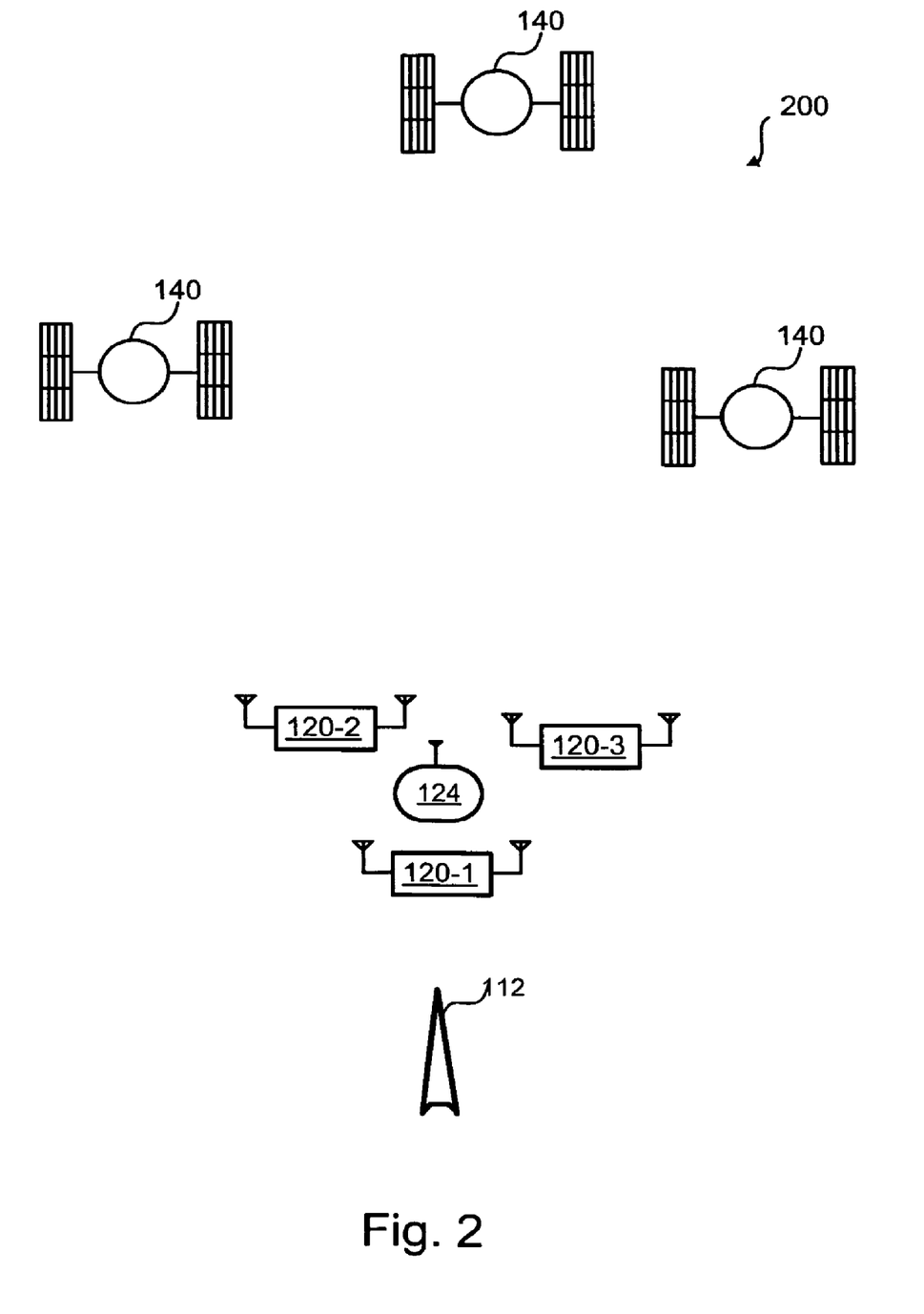
FIG. 2 is a block diagram of an embodiment of a portion of the dynamic almanac system.

With reference to FIG. 2, a block diagram of an embodiment of a portion 200 of the dynamic almanac system 100 that locates a base station 112, 124 is shown. This embodiment shows three wireless devices 120-1, 120-2, 120-3 within range of an uncooperative base station 124 and a cooperative base station 112. Each of the three wireless devices 120-1, 120-2, 120-3 is able to fix their location using a number of satellite position beacons 140, but other embodiments could use other methods in determining their location. Each of the three wireless devices 120 determines their location and distance to the uncooperative base station 124. These measurements need not be at the same time and could be days or weeks apart.

After a wireless device 120 takes the measurement, the information is forwarded to the associated base station 112 for relay to the almanac processor 122. The information sent by each wireless device includes information to uniquely identify the base station 112, 124, a location of the wireless device 120, a distance between the wireless device 120 and the base station 112, 124. Some embodiments of the wireless device 120 may rely upon others to determine its location such that the wireless device 120 only need to identify itself and the location can be otherwise derived.

In one embodiment, the wireless device 120 doesn't determine a distance, but provides information to the associated base station 112 to allow others to make that determination. For example, the wireless device 120 may send a signal to the unassociated base station 124 who replies with the signal strength of the received signal. That signal strength can be used to determine distance given the communication mode and configuration of the wireless device 120.

Figure 3:
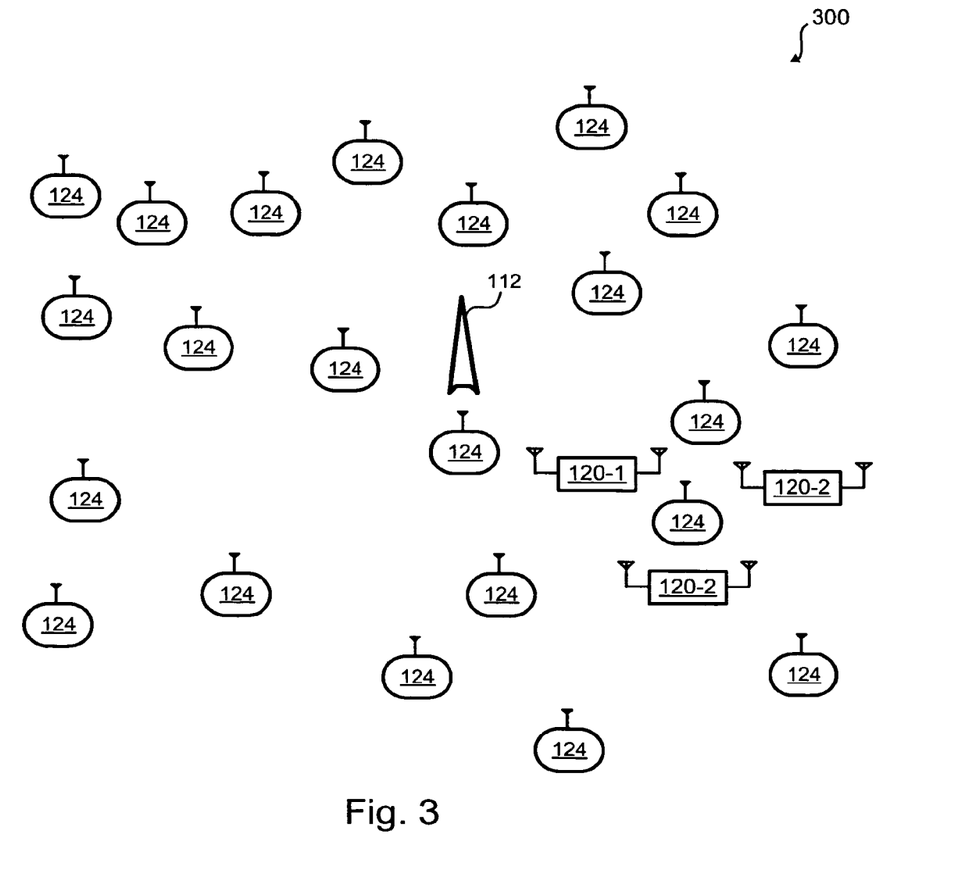
FIG. 3 is a block diagram of another embodiment of a portion of the dynamic almanac system.

Referring next to FIG. 3, a block diagram of another embodiment of a portion 300 of the dynamic almanac system 100 that locates base stations 112, 124 is shown. In this embodiment, two wireless devices 120-1, 120-2 determine a location of an uncooperative base station 124. On two separate occasions, the second wireless device 120-2 takes measurements to the base station 124. These measurements could be minutes or days apart. The measurements are communicated to a cooperative base station 112. In this embodiment, the wireless devices 120 do not independently determine their location, but rely upon measurements from the cooperative base stations 112.

Figure 4:
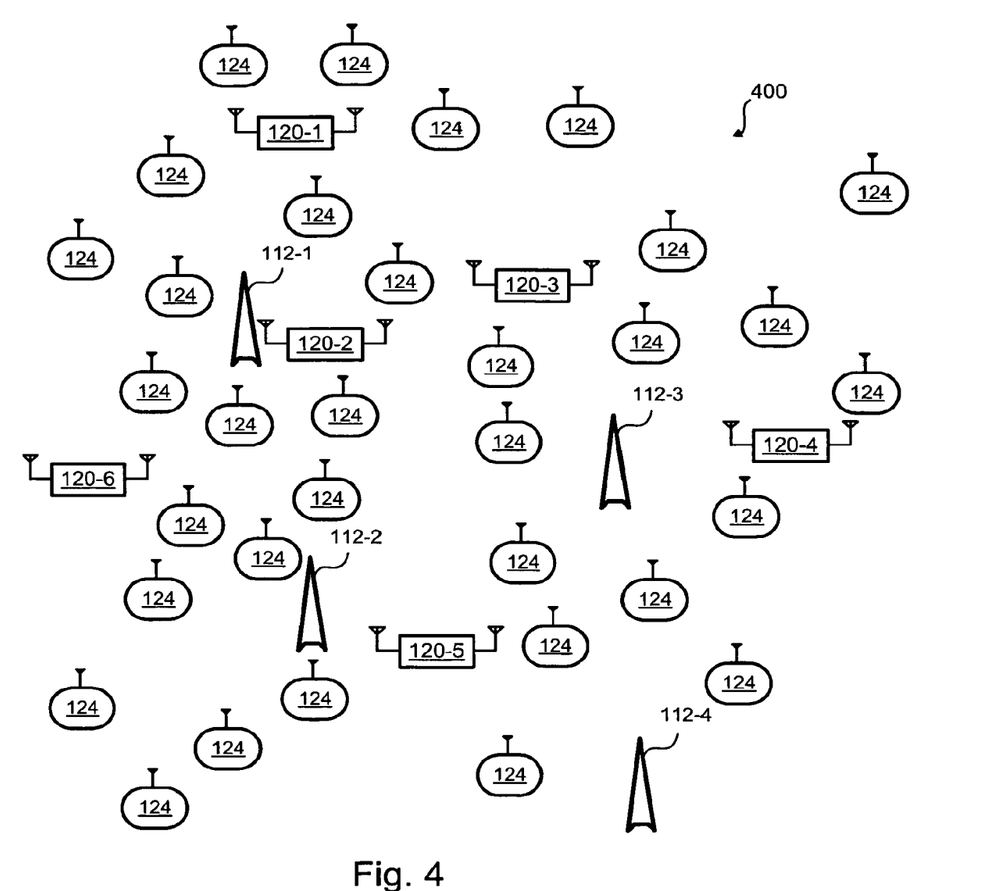
FIG. 4 is a block diagram of yet another embodiment of a portion of the dynamic almanac system.

With reference to FIG. 4, a block diagram of yet another embodiment of a portion 400 of the dynamic almanac system 100 having multiple wireless devices 120 gathering almanac information. In this embodiment, six wireless devices 120 are traveling through a number of base stations 112, 124 taking location measurements. The wireless devices 120 in this embodiment are end-user equipment that is sold or leased to the end-user. The measurements could be taken when the wireless device has available resources so as to not interfere with the normal operation expected by the user. The wireless devices 120 in this embodiment determine their location by taking measurements to base stations 112, 124 and referencing an almanac that has location information for those base stations 112, 124.

Figure 5:
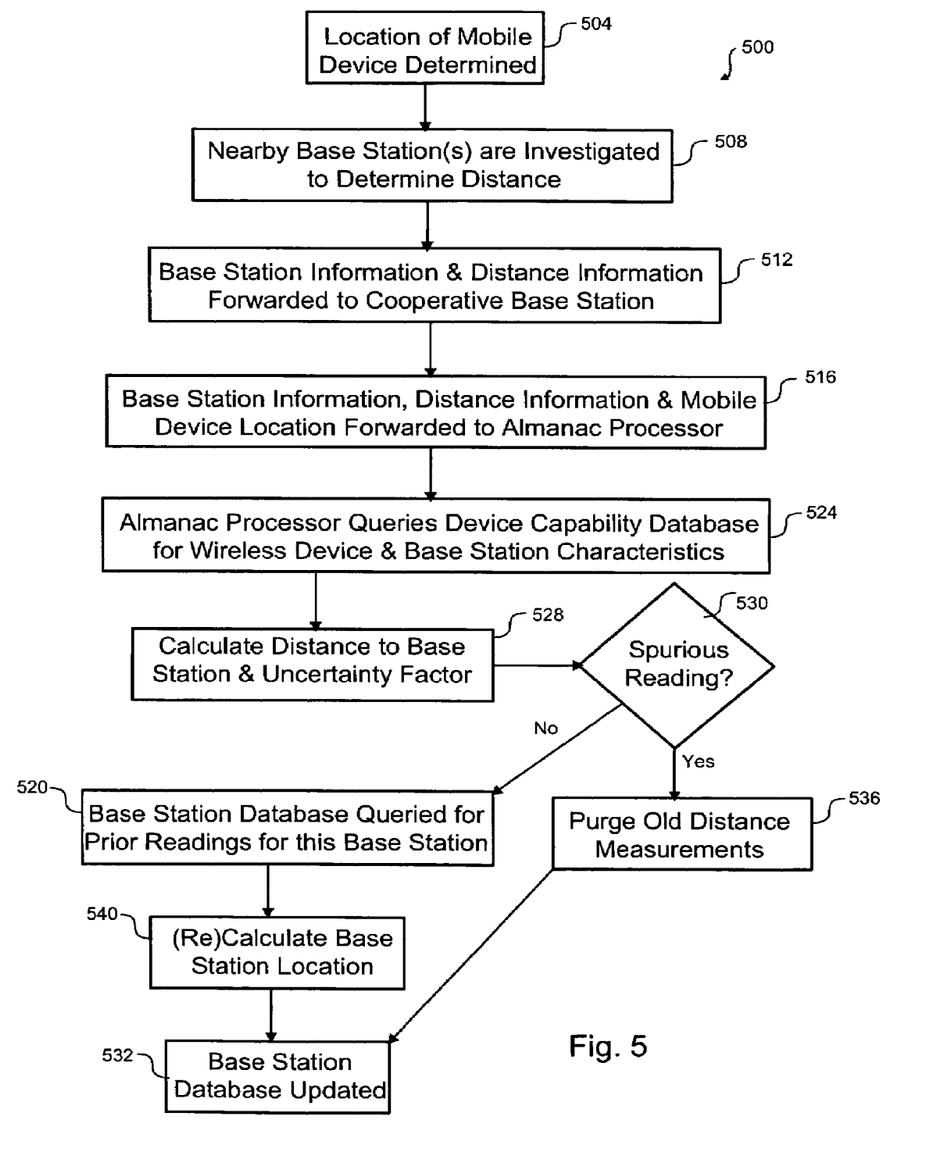
FIG. 5 is a flow diagram of an embodiment of a process for dynamically updating a base station almanac.

Referring next to FIG. 5, a flow diagram of an embodiment of a process 500 for dynamically updating a base station almanac is shown. In this embodiment, the wireless device 120 relies upon the system 100 to determine its location. The depicted portion of the process 500 begins in step 504 where the location of the mobile device 120 is determined. This determination could be performed after the wireless device 120 reports a base station measurements or the system 100 could have persistent knowledge of the location of wireless devices 120.

In step 508, the nearby base stations 112, 124 are investigated to determine if they can provide distance information. This could be in the form of any measurement that could be correlated to a location, however loose that correlation. With one or more measurements, location could be determined even if no ranging information were available by knowing the range of communication. With more and better measurements, the error in the location determination can be reduced.

The base station information and the distance information gathered by the wireless device 120 is forwarded to a cooperative base station 112 in step 512. The wireless device 120 could send the information immediately, periodically, when queried or during periods of relative inactivity. In this embodiment, the base station information and the distance information are forwarded to the cooperative base station 112, but other embodiments could process the information before sending. The base station information includes any information that could be used to identify the manufacturer and model of the base station 112, 124. The model information includes the type of the communication mode supported by the base station. The distance information could be a derived distance or any measurement that could allow calculating a distance. For example, signal strength of a signal received from the base station 112, 124 could be used.

The cooperative base station 112 may or may not process the information from the wireless device 112 in various embodiments. In step 516, any processed or unprocessed information is forwarded from the cooperative base station 112 to the almanac processor 112 using a wide area network 110 of some sort. A unique identifier may be determined for the base station 112, 124 where that identifier provided by the base station is not unique in and of itself. The almanac processor 122 also queries the device capability database 140 to get information on the base station 112, 124 and wireless device 120. This information from the two databases is used to determine a location of the base station 112, 124 and any accuracy to assign to that location determination.

In step 528, the location of the base station 112, 124 is recalculated with the new information along with an uncertainty factor. The uncertainty factor takes into account the accuracy of measurements with the base station 112, 124 and the accuracy of measurements with the mobile device. The device capability database 140 has information on various devices to calculate the uncertainty factor.

In some embodiments, the uncertainty factor increases with the age of the distance measurement. Increasing the uncertainty factor favors more recent readings that would more accurately track any movement of a base station that can be easily moved. Knowing the manufacturer and model of the base station 112, 124 can help know if or how to age the uncertainty factor. The more difficult to move the base station 112, 124, the slower the uncertainty in the factor would increase. For example, where the base station 112, 124 is in a moving vehicle, the uncertainty factor would increase quickly. A permanently installed cell tower would have its uncertainty factor age much more slowly. In an alternative embodiment, the uncertainty factor does not age with time.

Checks are performed in step 530 on the distance calculation to determine if the new information is consistent enough with prior readings. Some base stations 112, 124 can be moved such that trilateration with distance readings before and after the move will produce inaccurate results. In this step, the distance between the prior determined location and the mobile device location are calculated. Where the currently measured distance is within some reasonable percentage beyond what the calculated distance and uncertainty factor would allow, it is presumed that the base station 112, 124 has remained stationary.

Where the base station 112, 124 is unmoved, processing continues to step 540 where the location of the base station 112, 124 is calculated or recalculated. The almanac processor 122 queries the base station database 144 for any prior distance and uncertainty factor information for the unique identifier of the base station 112, 124 in step 520. All prior readings are weighted by their uncertainty factor when determining location. Where the uncertainty factor ages, the processing gives preference to more recent distance readings when determining the location of the base station 112, 124. The base station database 144 is updated in step 532 with the new location and any distance readings. Any almanacs provided after that point are formulated with the new location determination. Some embodiments may wait for two or three non-spurious distance measurements before calculating the location and skip step 540 until that point. The number of non-spurious distance measurements can be a function of an uncertainty factor. In other embodiments one or more new non-spurious distance measurements can be used to update the base station location.

Where it is determined in step 530 that the measured distance reading is beyond some reasonable threshold percentage from the calculated distance and the uncertainty factor, processing goes from step 530 to step 536. In step 536, old distance readings are purged where it is determined that the base station 112, 124 has moved. Some embodiments may require two or more spurious readings that confirm movement before purging old distances. The number of spurious readings can be a function of an uncertainty factor. Movement can be physical relocation of the base station 112, 124 or non-physical whereby the base station identifier can be (re)assigned to a different base station, for example.

Figure 6:
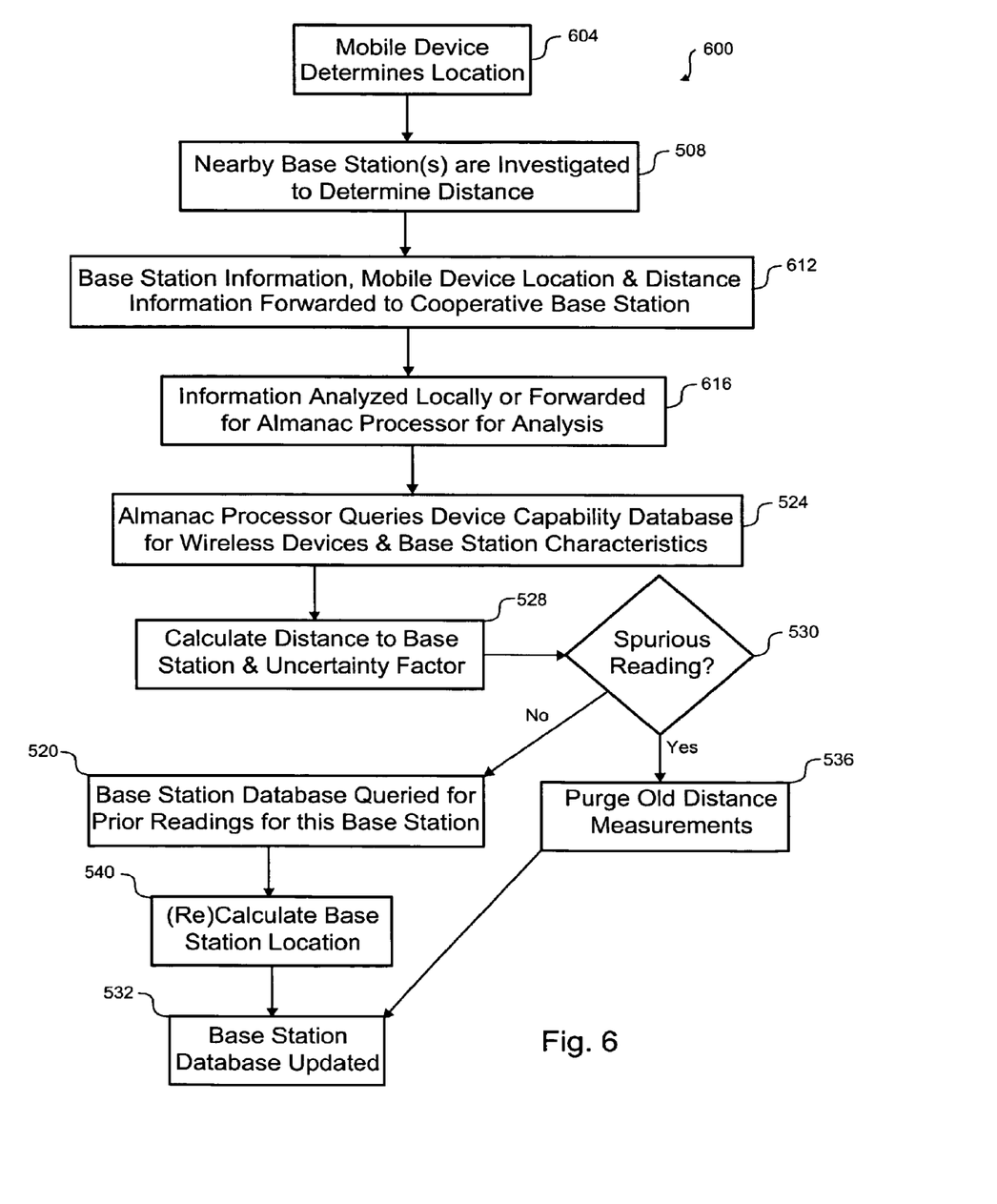
FIG. 6 is a flow diagram of another embodiment of a process for dynamically updating a base station almanac.

With reference to FIG. 6, a flow diagram of another embodiment of a process 600 for dynamically updating a base station almanac is shown. In this embodiment, the mobile device 120 is capable of determining its location independently. The location determination is performed in step 604. The nearby base stations 112, 124 are investigated in step 508. In step 612, base station information, location of the wireless device 120 and the distance between the wireless device 120 and base station 112, 124 are forwarded to a cooperative base station 112.

In step 616, the information from the wireless device 120 is analyzed locally and/or forwarded to the almanac processor 122 for analysis. In one embodiment, a cursory check of the information is performed by the cooperative base station 112 to confirm the reading is not spurious. After passing the cursory check, the information is passed to the almanac processor 122. In succession, steps 524, 528, 530, 520, 536, 540, and 532 are performed as in FIG. 5 to complete this portion of the process.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

What is claimed is:

1. A dynamic almanac system comprising:
machine-readable media having stored thereon
first location information indicative of a position of an uncooperative base station, the first location information being based at least in part on information from a user-controlled wireless device in a first position, the information from the user-controlled wireless device being received through one or more cooperative base stations facilitating voice and data traffic between the user-controlled wireless device and the one or more cooperative base stations, the user-controlled wireless device to receive one or more signals indicative of an identifier from the uncooperative base station, the uncooperative base station to not facilitate voice and data traffic from the user-controlled wireless device in the first position through the uncooperative base station,
second location information indicative of the position of the uncooperative base station, the second location information based at least in part on information from a wireless device in a second position, and
third location information indicative of the position of the uncooperative base station, the third location information based at least in part on information from a wireless device in a third position; and
an almanac processor to access the first, second, and third location information and calculate measured location information of the uncooperative base station using the first, second, and third location information and information indicative of the first, second, and third positions, the almanac processor further to assign a location uncertainty factor to the measured location information of the uncooperative base station and update an almanac using the measured location information of the uncooperative base station, the location uncertainty factor being indicative of range measurement inaccuracies associated with the wireless devices in the first, second, and third positions.

2. The dynamic almanac system of claim 1 wherein at least two of the wireless device in the first position, the wireless device in the second position, and the wireless device in the third position is the same wireless device in two different positions.

3. The dynamic almanac system of claim 1, the almanac processor further to determine that the uncooperative base station has moved.

4. The dynamic almanac system of claim 1 wherein at least two of the wireless device in the first position, the wireless device in the second position, and the wireless device in the third position is the same wireless device at two different times.

5. The dynamic almanac system of claim 1 wherein the almanac processor is co-located with the one or more cooperative base stations.

6. The dynamic almanac system of claim 1 wherein the one or more cooperative base stations are in communication with at least two of the almanac processor and the wireless device in the first position, the wireless device in the second position, and the wireless device in the third position.

7. The dynamic almanac system of claim 1 wherein at least one of the wireless device in the first position, the wireless device in the second position, and the wireless device in the third position comprises one or more of a tracking device, a child or parolee monitor, a navigational device, a wireless pager, and/or a wireless computer.

8. The dynamic almanac system of claim 1 wherein the first, second, and third positions are geographically separate.

9. The dynamic almanac system of claim 1, wherein the machine readable medium comprises one or more memories.

10. A method for dynamically updating an almanac using a plurality of wireless devices, comprising:
receiving first location information from a wireless device of the plurality of wireless devices located at a first position through one or more cooperative base stations facilitating voice and data traffic between the wireless device and the one or more cooperative base stations, the first location information being indicative of a position of an uncooperative base station with respect to the first position, the wireless device further to receive one or more signals indicative of an identifier from the uncooperative base station, the uncooperative base station to not facilitate voice and data traffic from the wireless device of the plurality of wireless devices located at the first position through the uncooperative base station;
obtaining information indicative of the first position;
receiving second location information from a wireless device of the plurality of wireless devices located at a second position, the second location information indicative of the position of the uncooperative base station with respect to the second position;
obtaining information indicative of the second position;
receiving third location information from a wireless device of the plurality of wireless devices located at a third position, the third location information indicative of the position of the uncooperative base station with respect to the third position;
obtaining information indicative of the third position;
assigning an associated uncertainty factor to at least one of the first, second, and third location information;
calculating a measured location of the uncooperative base station based at least in part on the first, second, and/or third location information and the first, second, and/or third positions and assigning a location uncertainty factor to the measured location of the uncooperative base station, the location uncertainty factor being indicative of range measurement inaccuracies associated with the wireless devices located at the first, second, and third positions; and
updating the almanac using the measured location of the uncooperative base station.

11. The method of claim 10 wherein said calculating comprises weighting at least one of the first, second, and third location information with the associated uncertainty factor.

12. The method of claim 10 wherein an uncertainty factor associated with the first distance is aged with time to indicate greater uncertainty.

13. The method of claim 10, further comprising:
ascertaining whether information received from at least one wireless device of the plurality of wireless devices indicates the uncooperative base station to be outside a predetermined threshold distance from the measured location; and wherein updating the almanac using the measured location comprises:
purging old location information from the almanac based at least in part upon said ascertaining; and
storing new location information indicative of the measured location.

14. The method of claim 10 further comprising:
ascertaining whether information received from at least one wireless device indicates the uncooperative base station is has moved from a previous location and within a predetermined threshold distance of variance from the previous location;
waiting for confirmation from another wireless device; and
wherein updating the almanac using the measured location comprises storing new location information and purging old location information indicative of the previous location if said ascertaining is confirmed during said waiting.

15. The method of claim 10 wherein at least one of the plurality of wireless devices includes one or more of a tracking device, a child or parolee monitor, a navigational device, a wireless pager, and/or a wireless computer.

16. A method for dynamically updating an almanac, comprising:
locating first, second, and third positions respectively of first, second, and third wireless phones;
estimating first, second, and third distances respectively between the first, second, and third wireless phones and an uncooperative base station, one or more of the first, second, and third wireless phones to receive one or more signals indicative of an identifier from the uncooperative base station, the uncooperative base station to not facilitate voice and data traffic from one or more of the first, second, and third wireless phones through the uncooperative base station;
reporting by way of one or more cooperative base stations facilitating voice and data traffic between the first, second, and third wireless phones and the one or more cooperative base stations to a point away from the first, second, and third wireless phones first, second, and third location information that is respectively related to the first, second, and third distances;
determining measured location information for the uncooperative base station from the first, second, and third location information and the first, second, and third distances and assigning a location uncertainty factor to the measured location information for the uncooperative base station, the location uncertainty factor being indicative of range measurement inaccuracies associated with the first, second, and third wireless phones;
updating a location of the uncooperative base station included in the almanac based at least in part on the measured location information;
wherein at least one of the first second, and third wireless phones is carried by an end user during said locating.

17. The method of claim 16 further comprising assigning an uncertainty factor to each of the first, second, and third distances.

18. The method of claim 16 wherein the first location information comprises information indicative of a unique identifier for the uncooperative base station.

19. The method of claim 17 wherein said assigning an uncertainty factor to each of the first, second, and third distances comprises assigning an uncertainty factor indicating increased uncertainty over time; and
wherein the reporting to a point away from the first, second, and third wireless phones comprises reporting to the one or more cooperative base stations.

20. The method of claim 16 wherein said estimating first, second, and third distances comprises estimating at least one of the first, second, and third distances at a location away from the associated wireless phone.

21. The method of claim 16 wherein said estimating first, second, and third distances comprises estimating at least one of the first, second, and third distances using the associated wireless phone.

22. The method of claim 16 wherein said determining measured location information is performed by a wireless phone.

23. The method of claim 16 wherein each of said estimating first, second, and third distances comprises:
receiving information indicative of a unique identifier for the uncooperative base station; and
presuming a distance to the uncooperative base station based at least in part upon one or more of a response delay, a signal strength, and/or a signal range.

24. The method of claim 16 wherein the location of the uncooperative base station included in the almanac is adjusted over time with new measured location information from one or more wireless phones.

25. The method of claim 16 wherein older location information in the almanac is deemphasized over time.

26. The method of claim 16 wherein at least one of the first, second, and third wireless phones is owned by an end user.

27. The method of claim 16 wherein the uncooperative base station comprises a local area network base station.

28. The method of claim 16 wherein at least one of the first wireless phone, the second wireless phone, and the third wireless phone is operable using a particular service provider, and wherein the uncooperative base station comprises a cellular phone base station for another service provider not under a roaming agreement with the service provider.

29. The method of claim 16 further comprising:
determining a likelihood the uncooperative base station will move from a current location of the uncooperative base station; and
preventing the measured location from being used in the almanac based at least in part on the likelihood.

30. An article, comprising: a computer readable medium having stored thereon instructions executable by a processor to:
process first information indicative of a location of an uncooperative base station, said first information being based at least in part on information received from a wireless device in a first position, the information from the wireless device in the first position to be received through one or more cooperative base stations facilitating voice and data traffic between the wireless device in the first position and the one or more cooperative base stations, the wireless device in the first position to receive one or more signals indicative of an identifier from the uncooperative base station, the uncooperative base station to not facilitate voice and data traffic from the wireless device in the first position through the uncooperative base station;
process second information indicative of the location of the uncooperative base station, said second information being based at least in part on information received from a wireless device in a second position;
process third information indicative of the location of the uncooperative base station, said third information being based at least in part on information received from a wireless device in a third position;
associate an uncertainty factor with at least one of the first information, the second information, and the third information, the uncertainty factor being indicative of range measurement inaccuracies associated with one or more of the wireless devices in the first, second, and third positions; and
update a base station position database based at least in part on one or more of the first information, the second information, the third information, and/or the uncertainty factor.

31. A dynamic almanac system to update an almanac with information from a plurality of wireless phones, comprising:
means for receiving first location information from a first wireless phone of the plurality of wireless phones, the first location information being indicative of a separation between the first wireless phone and an uncooperative base station, the first location information from the first wireless phone to be received through one or more cooperative base stations facilitating voice and data traffic between the first wireless phone and the one or more cooperative base stations, the first wireless phone to receive one or more signals indicative of an identifier from the uncooperative base station, the uncooperative base station to not facilitate voice and data traffic from the first wireless phone of the plurality of wireless phones through the uncooperative base station;
means for retrieving a first position of the first wireless phone;
means for receiving second location information from a second wireless phone of the plurality of wireless phones, the second location information indicative of a separation between the second wireless phone and the uncooperative base station;
means for retrieving a second position of the second wireless phone;
means for receiving third location information from a third wireless phone of the plurality of wireless phones, the third location information indicative of a separation between the third wireless phone and the uncooperative base station;
means for retrieving a third position of the third wireless phone, wherein at least one of the first, second, and third wireless phones is under control of an end user;
means for calculating a measured location of the uncooperative base station based at least in part the first, second, and/or third location information and the first, second, and/or third positions;
means for assigning a location uncertainty factor to the measured location of the uncooperative base station, the location uncertainty factor being indicative of range measurement inaccuracies associated with one or more of the first, second, and third wireless phones; and
means for updating the almanac with the measured location.

32. The dynamic almanac system of claim 31, further comprising:
means for determining a first distance between the first position and the uncooperative base station using the first location information;
means for determining a second distance between the second position and the uncooperative base station using the second location information;
means for determining a third distance between the third position and the uncooperative base station using the third location information; and
wherein the means for calculating a measured location of the uncooperative base station using the first, second, and/or third location information and the first, second, and/or third positions comprises means for calculating the measured location of the uncooperative base station using the first, second, and/or third positions and the first, second, and/or third distances.

33. An apparatus, comprising:
means for locating first, second, and third positions respectively of first, second, and third wireless phones;
means for estimating first, second, and third distances respectively between the first, second, and third wireless phones and an uncooperative base station, one or more of the first, second, and third wireless phones to receive one or more signals indicative of an identifier from the uncooperative base station, the uncooperative base station to not facilitate voice and data traffic from one or more of the first, second, and third wireless phones through the uncooperative base station;
means for reporting by way of one or more cooperative base stations facilitating voice and data traffic between the first, second, and third wireless phones and the one or more cooperative base stations to a point away from the first, second, and third wireless phones first, second, and third location information that is respectively related to the first, second, and third distances;
means for determining measured location information for the uncooperative base station from the first, second, and third location information and the first, second, and third distances and means for assigning a location uncertainty factor to the measured location information for the uncooperative base station, the location uncertainty factor being indicative of range measurement inaccuracies associated with one or more of the first, second, and third wireless phones;
means for updating a location of the uncooperative base station included in the almanac based at least in part on the measured location information for the uncooperative base station;
wherein at least one of the first second, and third wireless phones is carried by an end user during said locating.

34. The apparatus of claim 33, further comprising means for assigning an uncertainty factor to each of the first, second, and third distances.

35. The apparatus of claim 34, wherein said means for assigning an uncertainty factor to each of the first, second, and third distances comprises assigning an uncertainty factor indicating increased uncertainty over time; and
wherein the reporting to a point away from the first, second, and third wireless phones comprises reporting to a cooperative base station.

36. The apparatus of claim 33, wherein the first location information comprises information indicative of a unique identifier for the uncooperative base station.

37. The apparatus of claim 33, wherein said means for estimating the first, second, and third distances comprises means for estimating at least one of the first, second, and third distances at a location away from the associated wireless phone.

38. The apparatus of claim 33, wherein said means for estimating the first, second, and third distances comprises means for estimating at least one of the first, second, and third distances using the associated wireless phone.

39. The apparatus of claim 33, wherein said means for estimating the first, second, and third distances comprises:
means for receiving information indicative of a unique identifier for the uncooperative base station; and
means for estimating a distance to the uncooperative base station based at least in part upon one or more of a response delay, a signal strength, and/or a signal range.

40. The apparatus of claim 33, wherein the location of the uncooperative base station included in the almanac is adjusted over time with new measured location information from one or more wireless phones.

41. The apparatus of claim 33, wherein older location information in the almanac is deemphasized over time.

42. The apparatus of claim 33, wherein at least one of the first, second, and third wireless phones is owned by an end user.

43. The apparatus of claim 33, wherein the uncooperative base station comprises a local area network base station.

44. The apparatus of claim 33, wherein at least one of the first wireless phone, the second wireless phone, and the third wireless phone is operable using a particular service provider, and wherein the uncooperative base station comprises a cellular phone base station for another service provider not under a roaming agreement with the service provider.

45. The apparatus of claim 33, further comprising:
means for determining a likelihood the uncooperative base station will move from a current location of the uncooperative base station; and
means for preventing the measured location from being used in the almanac based at least in part on the likelihood.

* * * * *